(12) United States Patent
Maidment

(10) Patent No.: US 11,154,766 B2
(45) Date of Patent: Oct. 26, 2021

(54) TRACKED PERSONAL SNOW TRANSPORT SYSTEM

(71) Applicant: Roshell Industries Incorporated, St. John's (CA)

(72) Inventor: James Maidment, Colliers-Riverhead (CA)

(73) Assignee: ROSHELL INDUSTRIES INCORPORATED, St. John's (CA)

( * ) Notice: Subject to any disclaimer, the term of this patent is extended or adjusted under 35 U.S.C. 154(b) by 234 days.

(21) Appl. No.: 16/492,847

(22) PCT Filed: Mar. 9, 2018

(86) PCT No.: PCT/CA2018/050289
§ 371 (c)(1),
(2) Date: Sep. 10, 2019

(87) PCT Pub. No.: WO2018/161176
PCT Pub. Date: Sep. 13, 2018

(65) Prior Publication Data
US 2020/0129841 A1  Apr. 30, 2020

Related U.S. Application Data

(60) Provisional application No. 62/470,081, filed on Mar. 10, 2017.

(51) Int. Cl.
*A63C 11/10* (2006.01)
*B62D 51/00* (2006.01)
(Continued)

(52) U.S. Cl.
CPC ............ *A63C 11/10* (2013.01); *B62D 51/007* (2013.01); *B62D 51/04* (2013.01); *B62D 55/07* (2013.01)

(58) Field of Classification Search
CPC ........... A63C 5/08; A63C 5/085; A63C 11/10; B62D 51/007; B62D 51/04; B62D 55/07
(Continued)

(56) References Cited

U.S. PATENT DOCUMENTS 3,826,323 A * 7/1974 Mehne .................. A63C 5/085
                                                  180/180
4,301,884 A    11/1981 Taylor
(Continued)

FOREIGN PATENT DOCUMENTS

CA      2116817 A1    9/1994
EP      0091707 A1   10/1983
(Continued)

OTHER PUBLICATIONS

International Search Report and Written Opinion for PCT/CA2018/050289, International Searching Authority, dated Jun. 21, 2018.
(Continued)

*Primary Examiner* — Minnah L Seoh
*Assistant Examiner* — Hosam Shabara
(74) *Attorney, Agent, or Firm* — Dentons Canada LLP

(57) ABSTRACT

The present disclosure provides a snow transport system with a frame comprising a base plate, a pair of opposed side plates mounted on opposed sides of the base plate, and a plurality of cross members extending between the side plates. A pair of convex lower track slides are mounted on lower portions of the pair of opposed side plates, and a pair of convex upper track slides are mounted on upper portions of the pair of opposed side plates. A drive wheel is mounted at an upper front portion of the frame, and an idler wheel mounted at a lower rear portion of the frame. A continuous track is wrapped around the drive wheel, the convex lower track slides, the idler wheel and the convex upper track slides. A motor assembly is mounted within the frame, and (Continued)

connected to the drive wheel through a transmission assembly. A push arm assembly is mounted to one side of the frame, the push arm assembly extending forwardly from the frame and having a push bar portion and user controls at a forward end thereof.

13 Claims, 10 Drawing Sheets

(51) Int. Cl.
    *B62D 51/04*    (2006.01)
    *B62D 55/07*    (2006.01)

(58) Field of Classification Search
    USPC ................................................ 180/9.22, 184
    See application file for complete search history.

(56) References Cited

U.S. PATENT DOCUMENTS

| | | | | |
|---|---|---|---|---|
| 4,519,470 | A * | 5/1985 | Allisio | A63C 5/08 |
| | | | | 180/180 |
| 6,193,003 | B1 * | 2/2001 | Dempster | A63C 11/10 |
| | | | | 180/180 |
| 6,626,255 | B1 | 9/2003 | Timm | |
| 7,575,075 | B2 * | 8/2009 | Fairhead | B62D 1/02 |
| | | | | 180/6.48 |
| 9,358,999 | B2 * | 6/2016 | Nadeau | B62D 1/12 |
| 9,694,859 | B2 * | 7/2017 | Martel | H01M 10/625 |
| 2016/0121944 | A1 | 5/2016 | Martel | |

FOREIGN PATENT DOCUMENTS

| | | |
|---|---|---|
| FR | 2431304 A1 | 2/1980 |
| GB | 1042943 A | 9/1966 |
| RU | 101684 U1 | 1/2011 |
| WO | 2014/059511 A1 | 4/2014 |
| WO | WO-2014059511 A1 * | 4/2014 ............ B62M 27/02 |

OTHER PUBLICATIONS

International Preliminary Report on Patentability for PCT/CA2018/050289, International Preliminary Examining Authority, dated Jul. 19, 2019.

Extended European Search Report issued in connection with related European Patent Application No. 18764059.4, European Patent Office, dated Mar. 23, 2021.

* cited by examiner

TRACKED PERSONAL SNOW TRANSPORT SYSTEM

CROSS-REFERENCE TO RELATED APPLICATION

This application claims the benefit of priority of U.S. Provisional Patent Application No. 62/470,081, which was filed on Mar. 10, 2017 and is hereby incorporated herein by reference in its entirety.

TECHNICAL FIELD

The present disclosure relates to a motorized personal snow transport system for propelling skiers and other snow sports participants.

BACKGROUND

Various attempts have been made to provide snow sports participants such as skiers, snowboarders, and the like with motorized assistance for travelling over flat or hilly terrain.

SUMMARY

One aspect of the present disclosure provides a snow transport system with a frame comprising a base plate, a pair of opposed side plates mounted on opposed sides of the base plate, and a plurality of cross members extending between the side plates. A pair of convex lower track slides are mounted on lower portions of the pair of opposed side plates, and a pair of convex upper track slides are mounted on upper portions of the pair of opposed side plates. A drive wheel is mounted at an upper front portion of the frame, and an idler wheel mounted at a lower rear portion of the frame. A continuous track is wrapped around the drive wheel, the convex lower track slides, the idler wheel and the convex upper track slides. A motor assembly is mounted within the frame, and connected to the drive wheel through a transmission assembly. A push arm assembly is mounted to one side of the frame, the push arm assembly extending forwardly from the frame and having a push bar portion and user controls at a forward end thereof.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
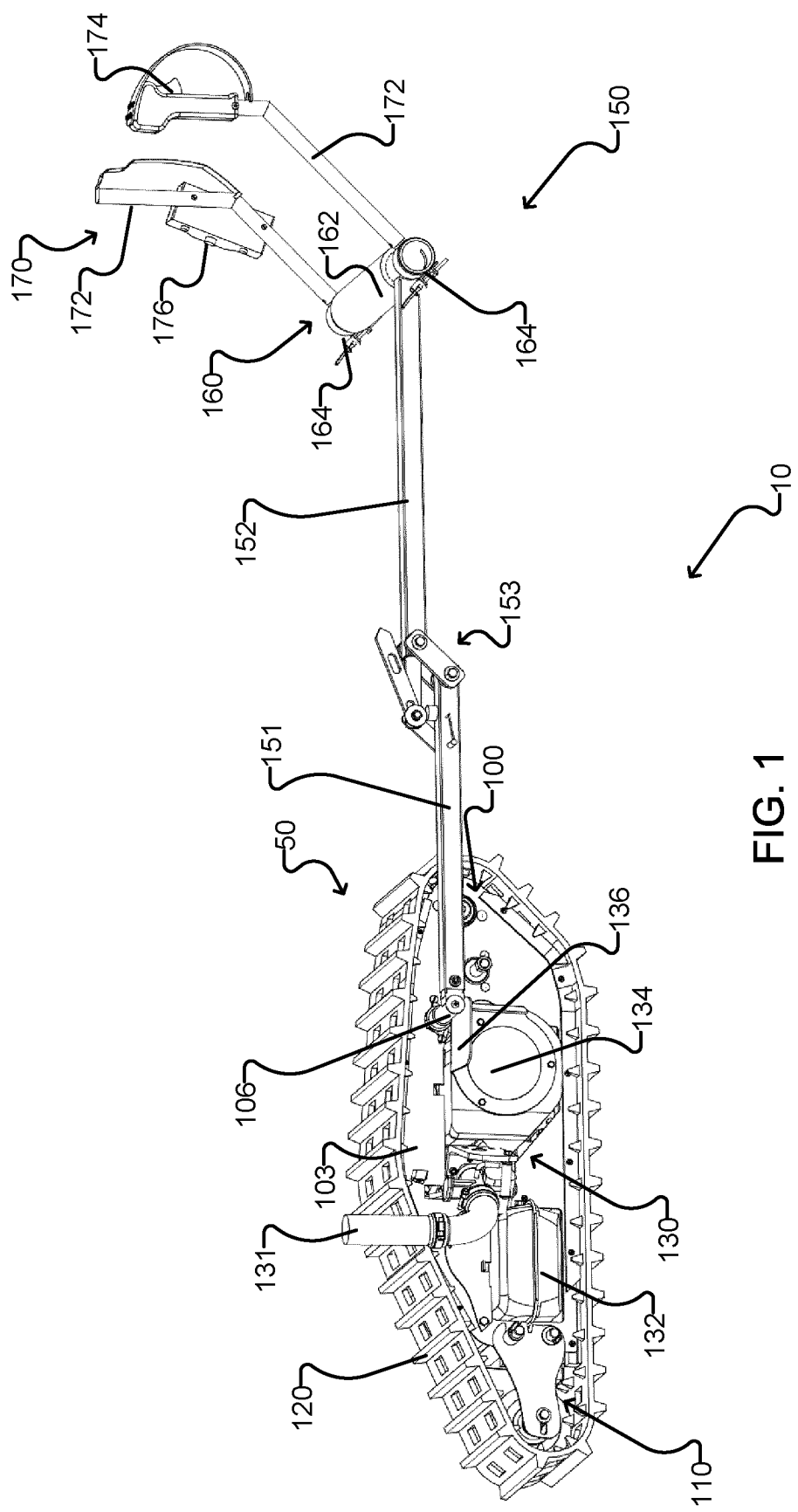
FIG. 1 shows an example snow transport system according to on embodiment of the present disclosure.
Figure 2:
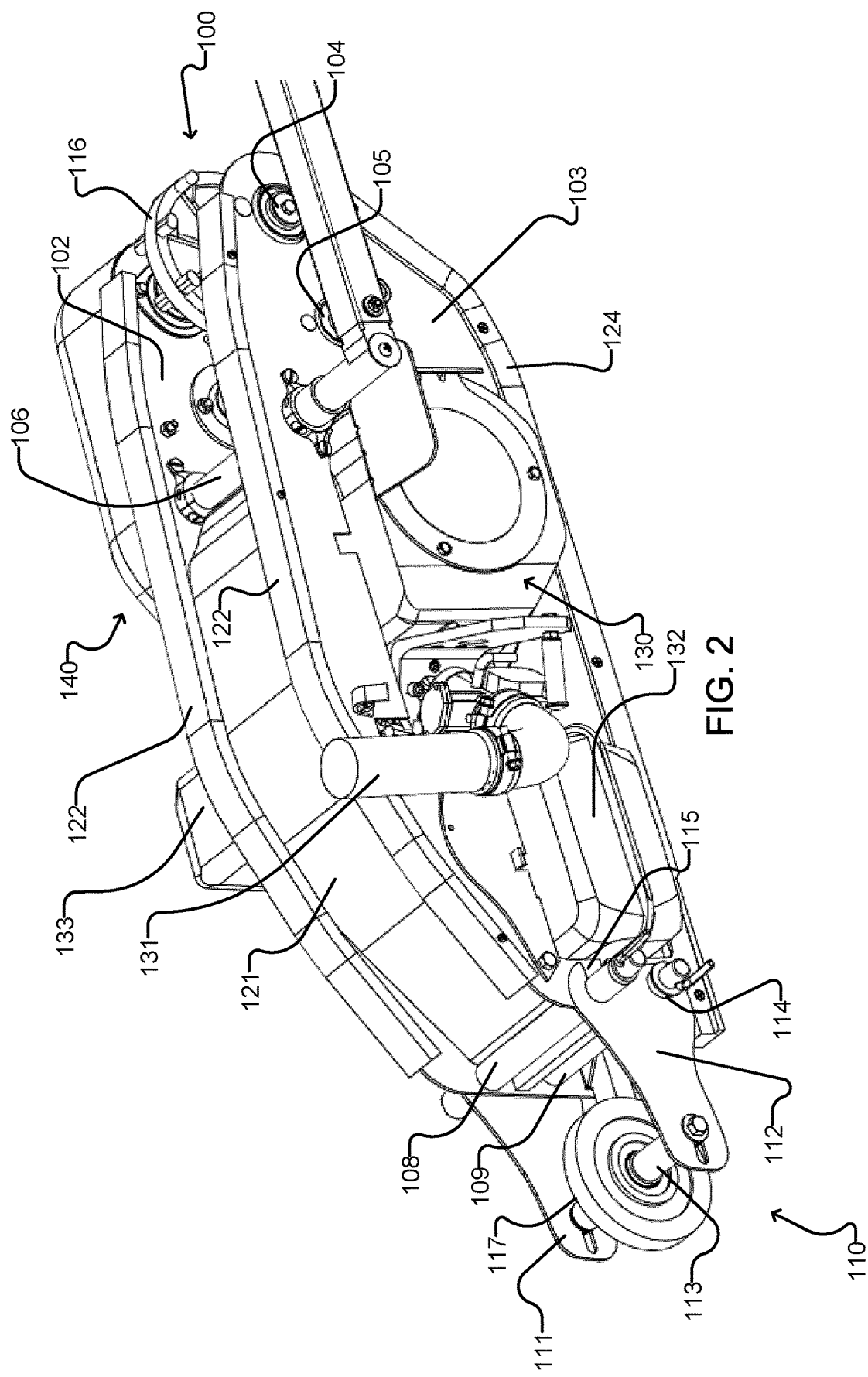
FIG. 2 shows the main body of the transport system of FIG. 1 with the track removed.
Figure 3:
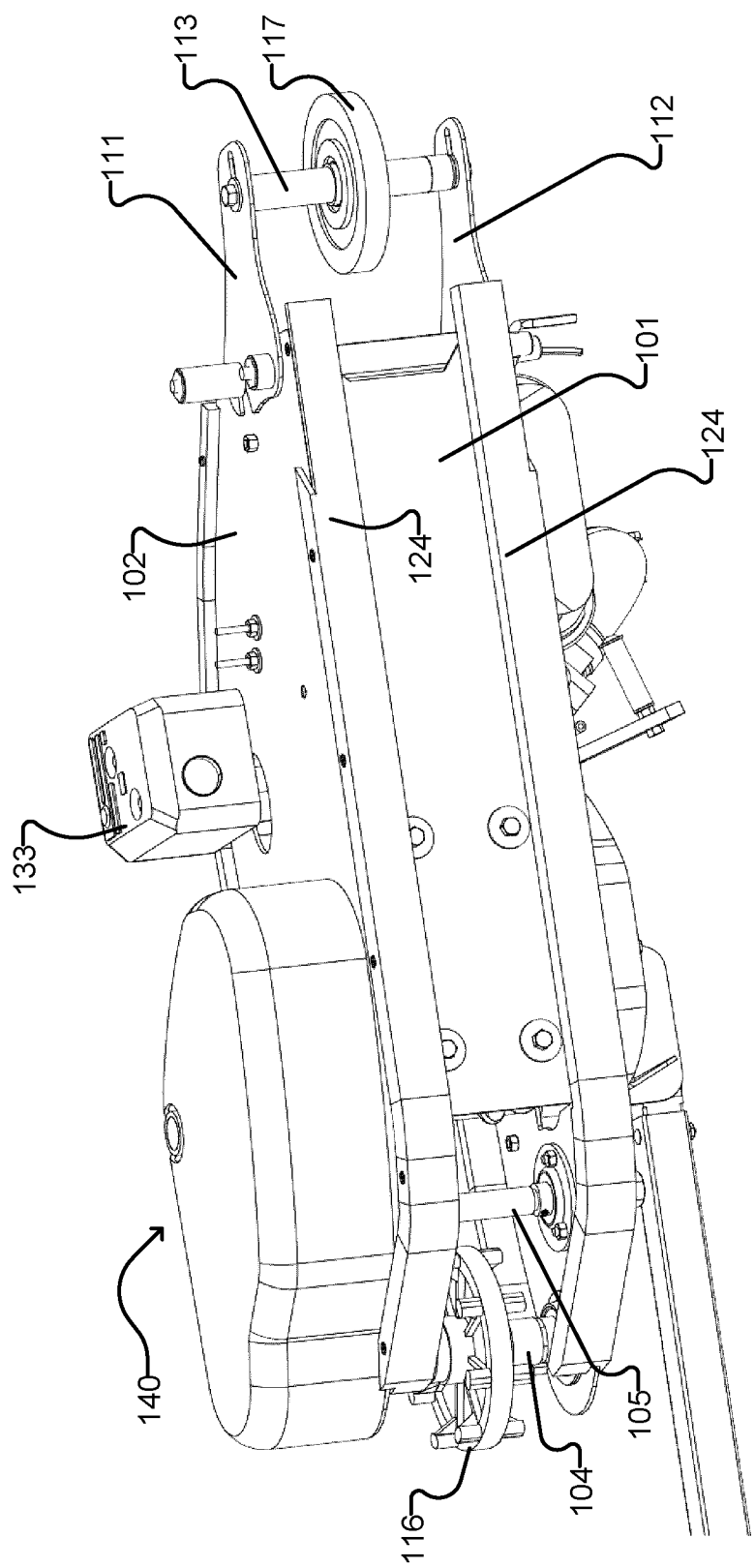
FIG. 3 is a bottom view of the transport system of FIG. 2.
Figure 4:
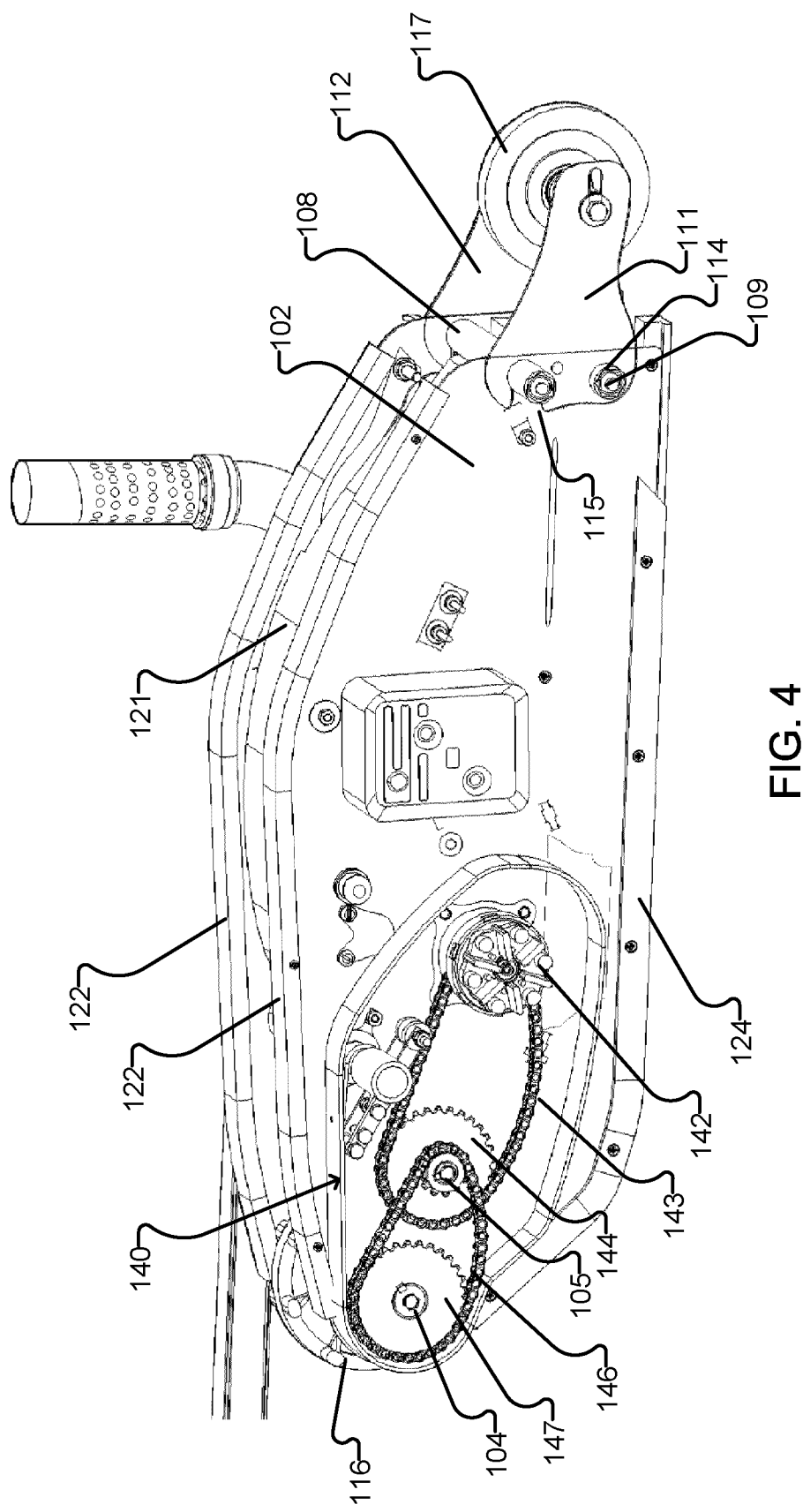
FIG. 4 is a side view of the transport system of FIG. 2 from the opposite side with the transmission cover removed.
Figure 5:
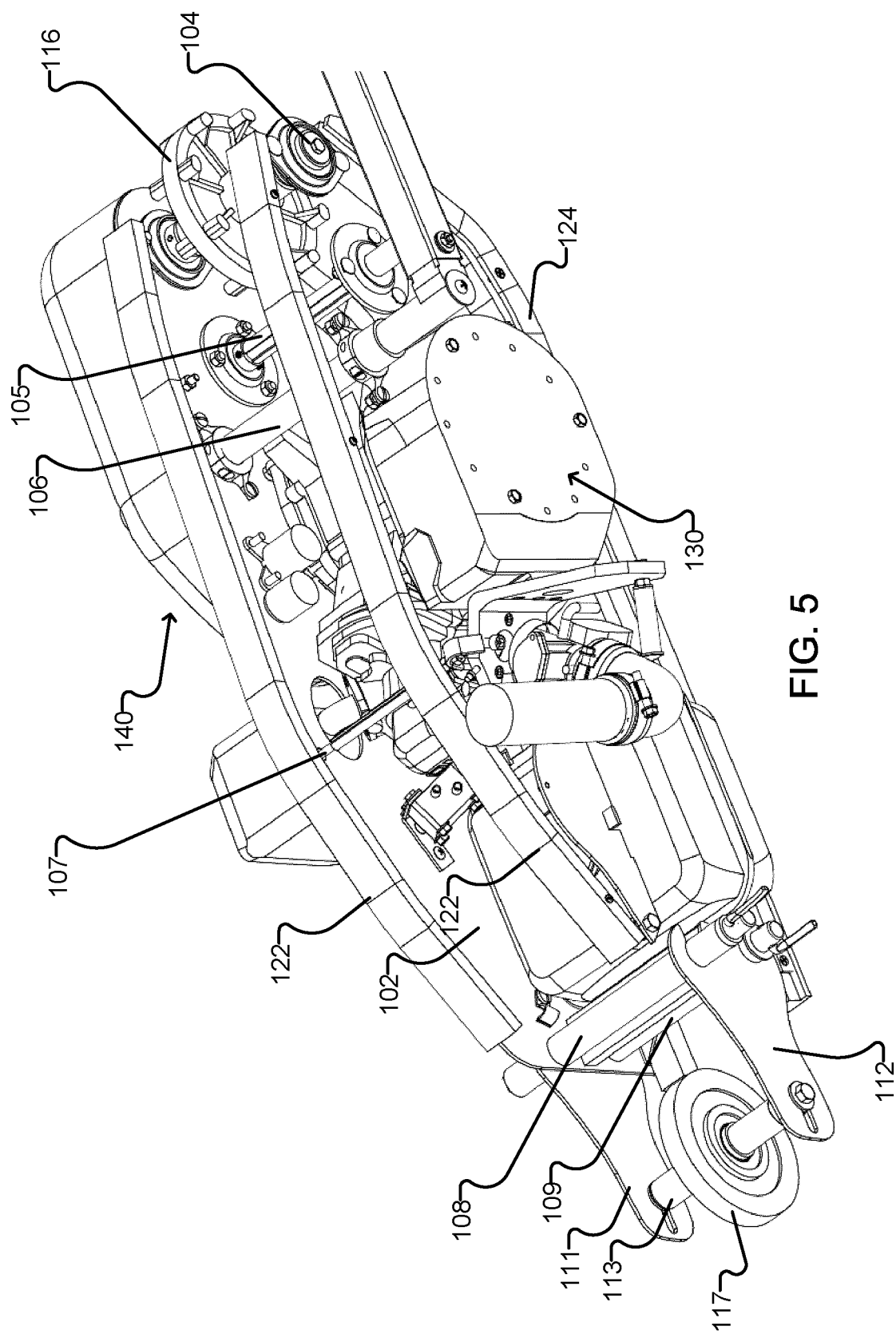
FIG. 5 shows the transport system of FIG. 2 with the top plate, intake filter flange and one of the side plates removed.
Figure 6:
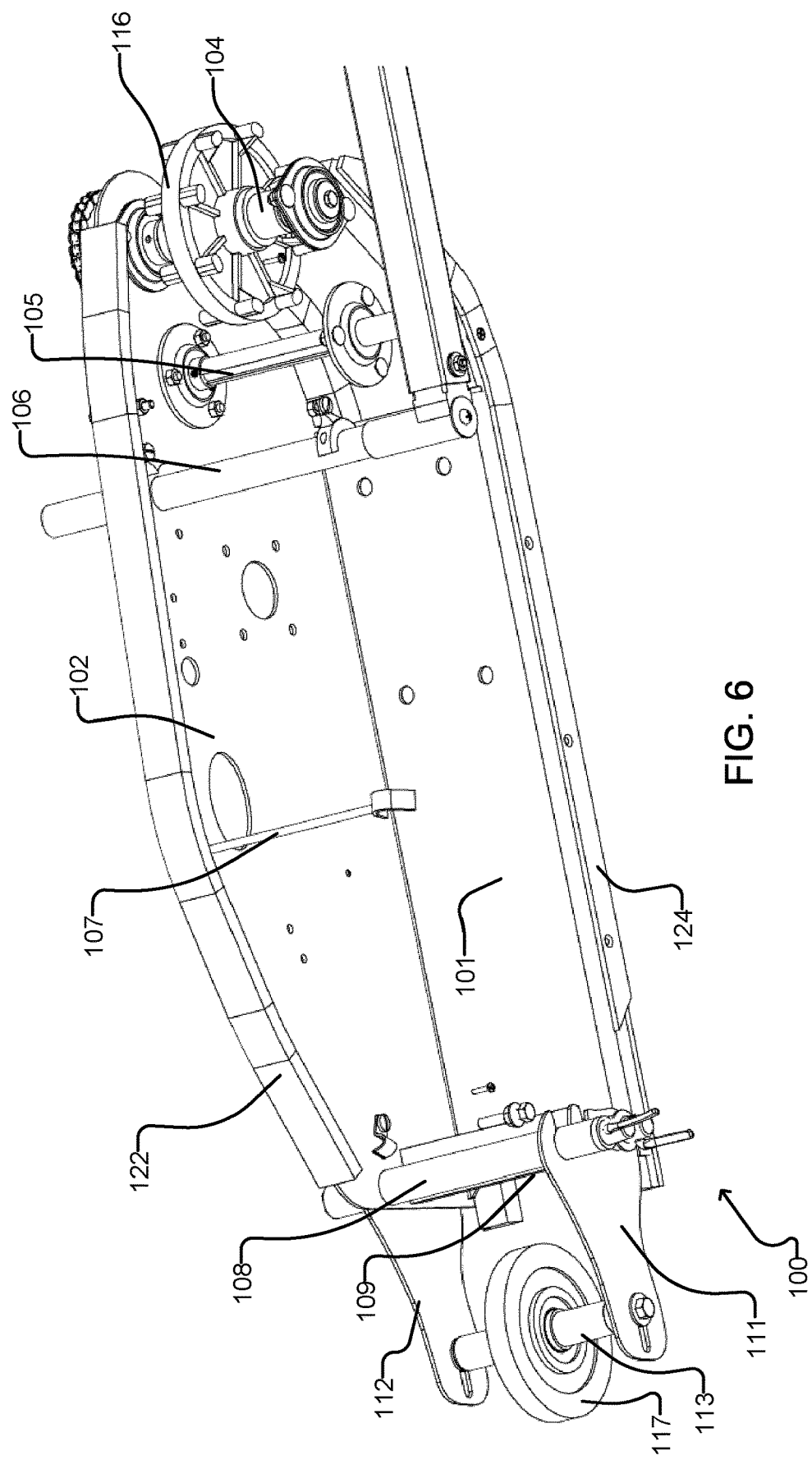
FIG. 6 shows the transport system of FIG. 4 with additional components removed to illustrate elements of the frame.

Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein. The present invention may be embodied in other specific forms without departing from its essential characteristics. The described embodiments are to be considered in all respects only as illustrative and not restrictive.

Embodiments of the present invention provide a tracked motorized snow transport system to assist a skier, snowboarder or other snow sports participant in travelling over flat or hilly terrain. Details of an example transport system 10 are illustrated in FIGS. 1 to 11.

The transport system 10 comprises a drive unit 50 with a push arm assembly 150 extending forwardly therefrom to support a push bar portion 160 and user controls 170 at the forward end thereof. To operate the transport system 10, a user stands in front of the transport system with the push bar portion 160 positioned against their lower buttocks, and operates the user controls 170 to drive a track 120 of the drive unit 50 and propel the user forward. In some embodiments, the push arm assembly 150 may also be pivoted to extend behind the drive unit 50, such that the user can be pulled behind the drive unit 50.

The drive unit 50 of transport system 10 comprises a frame 100 with a drive wheel 116 and an idler wheel 117 mounted thereon, around which a track 120 is wrapped. A motor assembly 130 is mounted within the frame 100, and connected to the drive wheel 116 by a transmission assembly 140 to drive the track 120. A push arm assembly 150 is mounted on one side of the frame 100 and extends forward to support a push bar portion 160 and user controls 170 at the forward end thereof. The location of the push arm assembly on the frame assists in maintaining safe operation of the snow transport system; the arm assembly is positioned high enough to avoid obstacles and forward enough to provide adequate momentum to the operator through varying pitches of terrain.

In the illustrated example the push bar portion 160 and user controls 170 are adapted for use by a skier, but these elements may be adapted for snowboarders or other users in other embodiments.

The frame 100 comprises a base plate 101 with a pair of opposed side plates 102, 103 attached to lateral sides thereof, and a plurality of cross members extending between the side plates 102, 103. Upper and lower track slides 122 and 124 are respectively mounted on the upper and lower portions of the side plates 102, 103 to allow the track 120 to slide thereacross, while providing a desirable amount of friction or drag as described further below. In the illustrated example the cross members comprise a drive shaft 104 for mounting the drive wheel 116, a secondary drive shaft 105, a push arm mounting bar 106, an upper support bar 107, and upper and lower tail piece support bars 108 and 109. A removable tail piece assembly 110 is detachably mounted on the tail piece support bars 108, 109 as described further below. The tail piece assembly 110 comprises a pair of opposed tail side plates 111, 112 with an idler shaft 113 connected therebetween, and the idler wheel 117 is mounted on the idler shaft 113. A top cover 121 may be provided between the side plates 102, 103 just below the upper track slides 122.

The motor assembly 130 is mounted on the base plate 101. In some embodiments, the motor assembly 130, and other components of the transport system 10 such as, for example a fuel tank, battery, bearings, track tensioner wheel, start solenoid, motor cover, track release mechanism, chain tensioner, track tensioner, upper and lower track slides, power unit arm link, and/or various other hardware are strategically positioned and configured to keep the center of mass of the transport system 10 as low as possible. In some embodiments, the motor assembly 130 and other components of the transport system 10 are positioned to achieve balanced left/right weight distribution, and for safety considerations as described below.

In some embodiments, a muffler 133 of the motor assembly is intentionally on the left side, opposite side to the fuel tank 132 for safety reasons. The exhaust port of the muffler 133 points downwards towards the snow for safety and noise baffling effect. In the illustrated example transport system 10, the carburetor (not specifically enumerated), fuel tank 132, fresh air intake 131 and electrical components are on the right hand side, and the muffler 133 and transmission assembly 140 are on the left hand side of the transport system.

Construction of the frame 100 is facilitated by the use of hard plastic bushings (not separately enumerated) between the side plates 102, 103 covering each of the drive shaft 104, the secondary drive shaft 105, the push arm mounting bar 106 and the tail piece support bars 108, 109. In some embodiments, all shafts and axles have threaded ends to accommodate locking bolts.

The upper and lower track slides 122 and 124 in conjunction with the front single drive wheel 116 and the rear adjustable idler wheel 117 provide the necessary drag to prevent excessive forward coasting. The slides 122 and 124 are constructed from hard nylon strips. This design is a safety feature of the snow transport system 10. Both the upper and lower track slides 122 and 124 are convex in the sense that they are curved such that the track 120 bears against the slides, and the friction opposing movement of the track 120 is sufficient to safely stop the transport system 10 when the throttle is not being applied. The lower track slides 124 are additionally configured to ensure even machine weight distribution to ground.

The shape of the drive unit 50, and in particular the shape of the side panels 102/103 and track slides 122/124, is configured to allow the drive unit 50 to travel over uneven terrain while maximizing contact between the track 120 and the snow. In particular, the front portions of the side panels 102/103 and lower track slides 124 are angled upwards (e.g. at an angle of about 40-60 degrees from horizontal, or preferably about 45-50 degrees from horizontal) to allow the drive unit 50 to go over uneven terrain, with the middle and rear portions of the side panels 102/103 and lower track slides 124 generally flat to provide good contact between the track 120 and the snow.

Figures 7, 8:
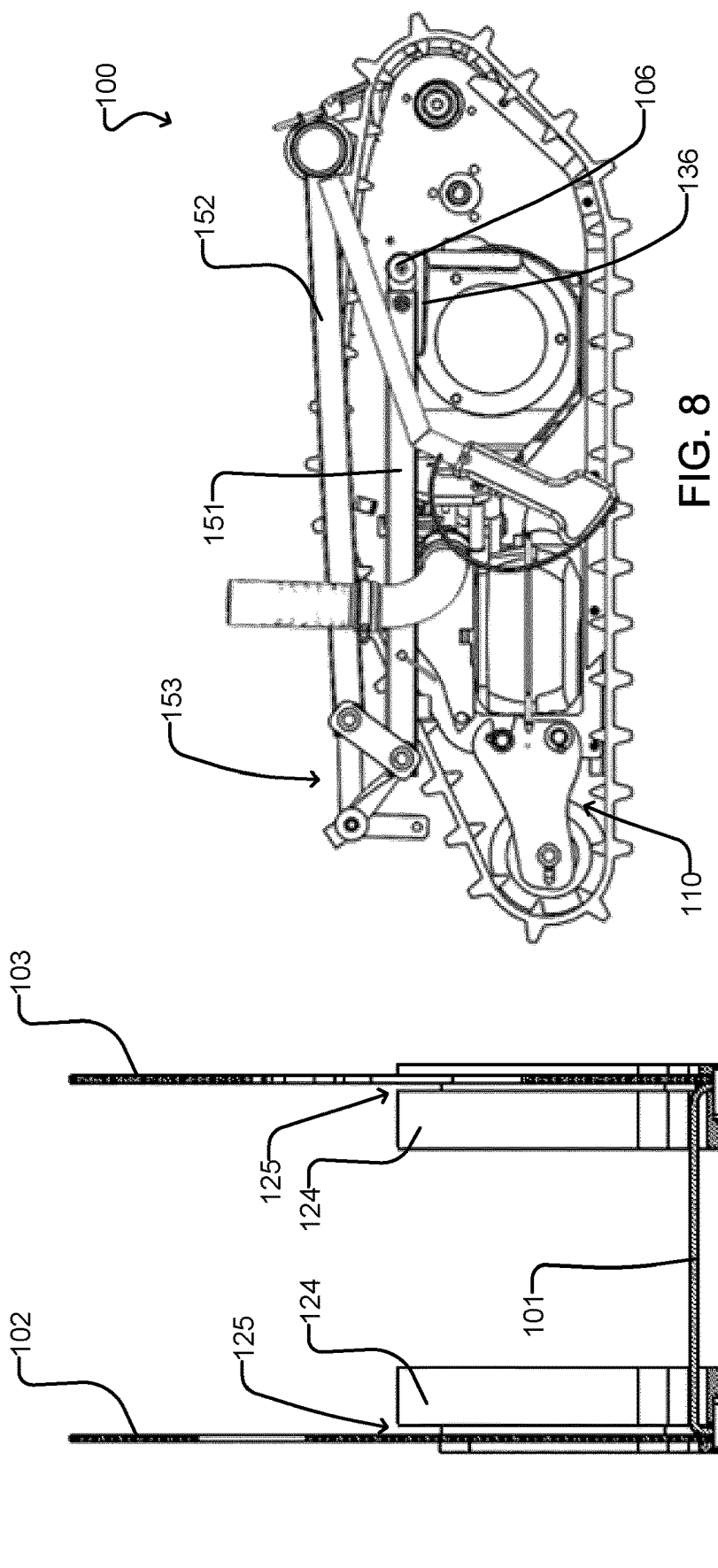
FIG. 7 is an end view of the base plate, side plates and lower track slides of the transport system of FIG. 1.
FIG. 8 shows the transport system of FIG. 1 with the push arm assembly in a folded configuration.
Figure 9:
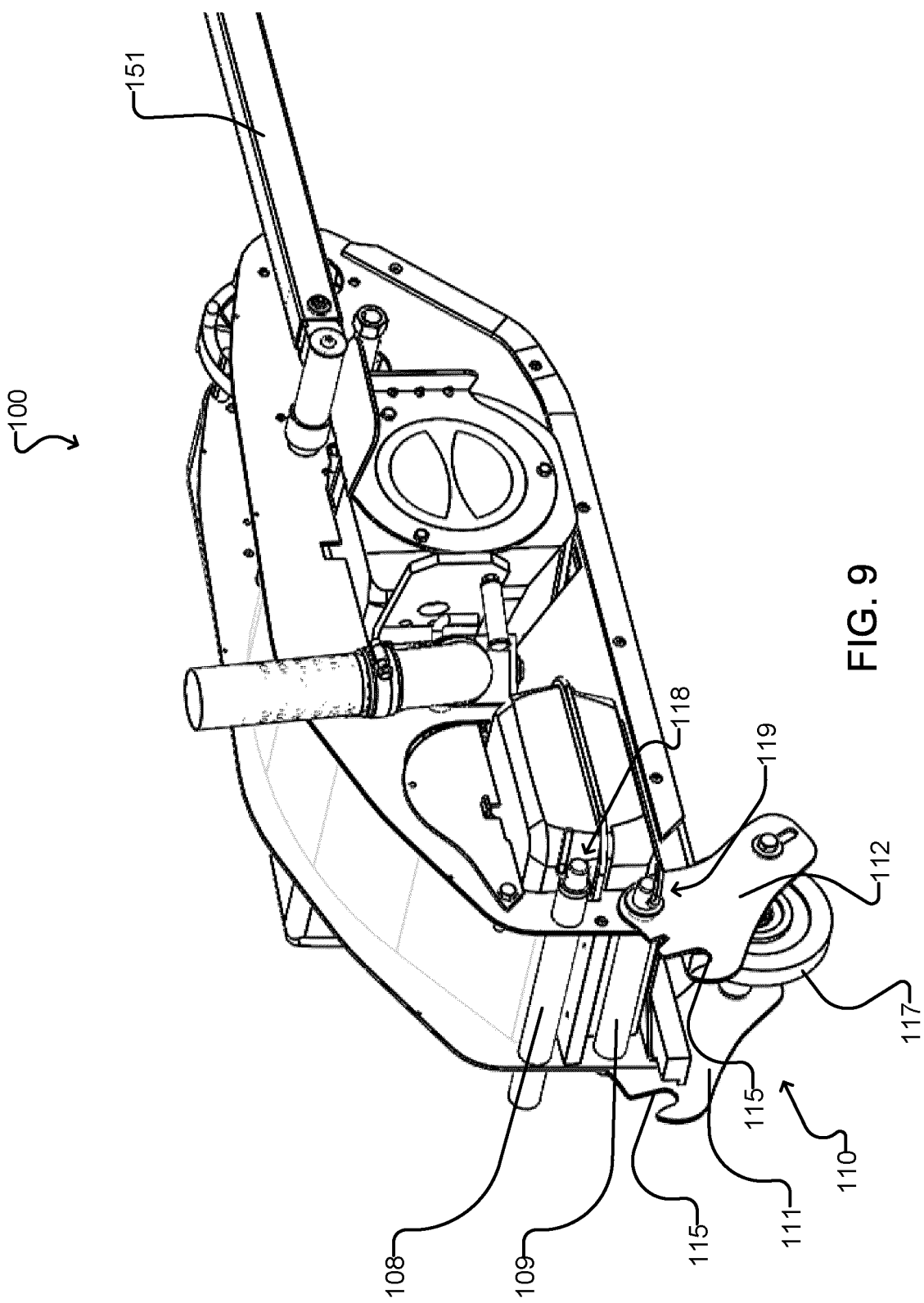
FIG. 9 shows the transport system of FIG. 1 with the track removed and the tail piece assembly folded pivoted underneath the drive unit.

The lower track slides 124 also act as support clamps between the side panels 102, 103 and base plate 101. As shown in FIG. 7, lateral side portions 101A of the base plate 101 are bent downwardly, and each of the lower track slides 124 has a groove 125 therein sized to receive one of the side portions 101A and a respective side plate 102/103.

In some embodiments the motor assembly 130 comprises a motor driving a centrifugal clutch 142 of the transmission assembly 140. In some embodiments the motor assembly 130 also comprises an air intake comprising an air intake filter 134 and a flange 136 for protecting the filter 134 and acting as a stop for the push arm assembly 150. The flange 136 acts as an operational stop to maintain a limited vertical positioning of the arm to hold the arm when in storage position, as described below.

The motor may for example, be a four stroke or two stroke gas powered motor, or an electric motor. The clutch 142 drives the secondary drive shaft 105 by means of a roller chain 143 engaging a sprocket 144 on the secondary drive shaft 105. The secondary drive shaft 105 operates as a gear reduction mechanism and drives, by means of another roller chain 146, a track drive sprocket 147 mounted on the drive shaft 104. The drive shaft 104 in turn drives the drive wheel 116, which engages the track 120. The track 120 may, for example, comprise a continuous rubber snowmobile-like track. In one embodiment, the track 120 is 11 inches wide and 96 inch in circumference. In one embodiment the track drive components include a removable chain tensioner on the first roller chain 143, which allows for enough slack in the first roller chain 143 to facilitate installation and removal of centrifugal clutch for maintenance.

In some embodiments the drive unit 50 has a quick-change track mechanism, which allows the tail piece assembly 110 to be pivoted underneath the drive unit 50 for installation and removal of the track 120. During installation, the entire drive unit 50 is inserted into the track and secured via extension of the quick-change track mechanism (QCTM). In the illustrated embodiment, the QCTM is provided by means of holes 114 in the tail side plates 111, 112 through which the lower tail piece support bar 109 is connected, and notches 115 in the tail side plates 111, 112 for detachably engaging the upper tail piece support bar 108. Bushings and a locking mechanism 118 (see FIG. 9) are provided to selectably lock the tail side plates 111, 112 in engagement with the upper tail piece support bar 108, such that when the locking mechanism 118 is disengaged, the tail piece assembly 110 may be rotated downwardly about the lower tail piece support bar 109 of allow installation or removal of the track 120. Another locking mechanism 119 may be provided to selectably lock the tail side plates 111, 112 in engagement with the lower tail piece support bar 109. The longitudinal (e.g. front-back) position of the idler wheel 117 is adjustable to fine-tune the tension of the track 120. Adjusting the position of the idler wheel 117 also allows for varying of the maximum track torque. A looser track 120 can permit cogs of the drive wheel 116 to slip over drive lugs of the track 120 if the throttle is fully open, thus limiting the maximum track torque. Providing for a reduced maximum track torque may be useful, for example, for beginner users.

In some embodiments, the tail piece assembly 110 can be removed easily with no tools and can be replaced with a different tail piece assembly with tail piece side plates to accommodate longer track sizes. When the tail piece assembly 110 is in the closed position the track tension urges the tail side plates 111, 112 onto the tail piece support bars 108, 109, to maintain the closed position.

In some embodiments, the upper tail piece support bar 108 and the push arm mounting bar 106 extend laterally outwardly beyond the side panels 102 and 103 and other components of the transport system 10 to provide mounting points for attaching a carrying rack or the like atop the drive unit 50. The mounting points provided by the upper tail piece support bar 108 may also be used for attaching a tow hitch or the like for towing a sled, trailer, or other unpowered transport system behind the transport system 10.

The push arm assembly 150 comprises a first arm section 151 pivotally connected to the frame 100 by means of the push arm mounting bar 106, and a second arm section 152 pivotally connected to the first arm section 151 by a four point clevis assembly 153. The clevis assembly 153 operates as a shock absorber within the entire arm structure by tensioning a rubber bungee cord between the first and second arm sections 151, 152, as described below.

Figure 10:
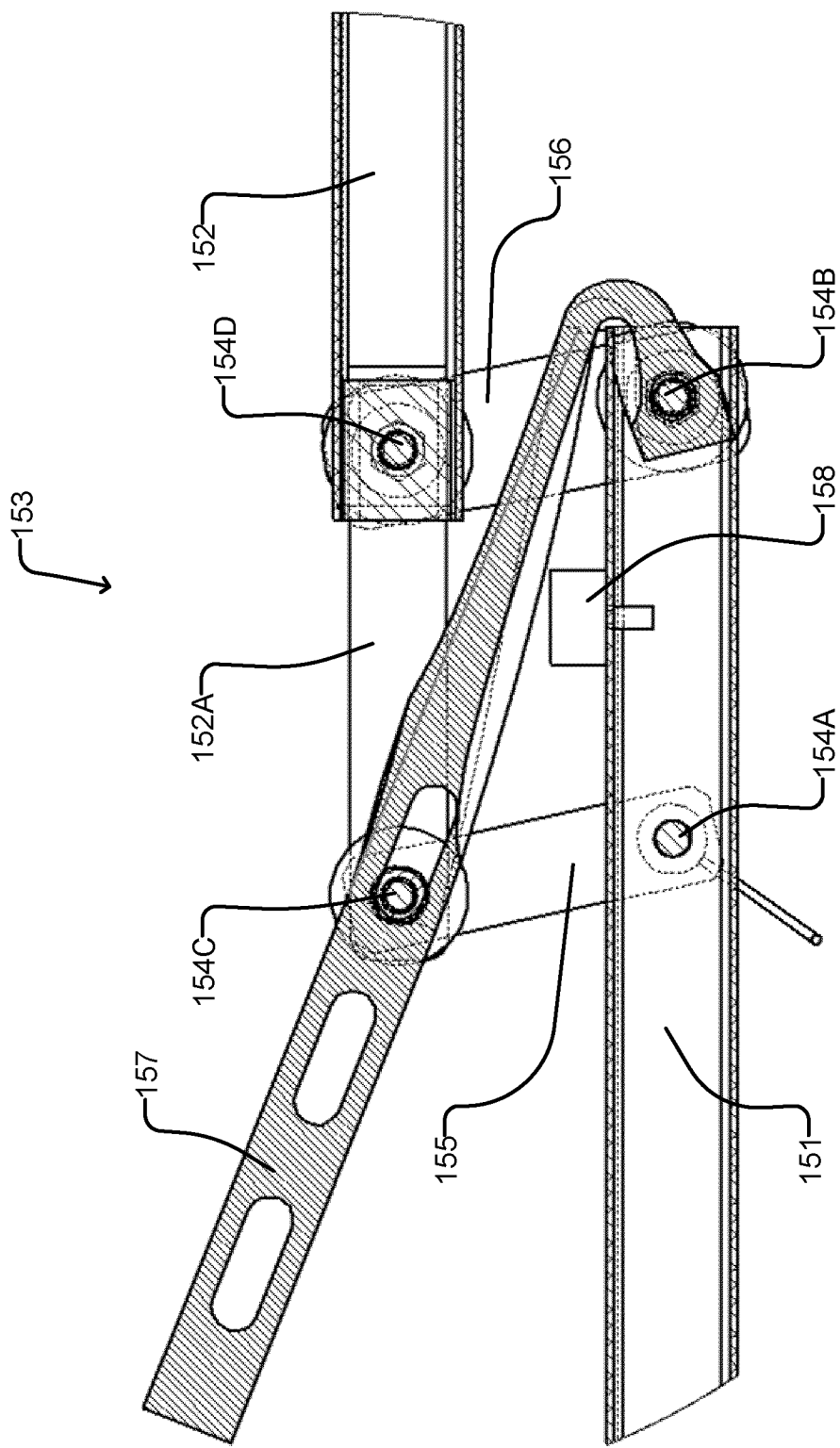
FIG. 10 shows details of the clevis assembly of the push arm assembly of the transport system of FIG. 1.
Figure 11:
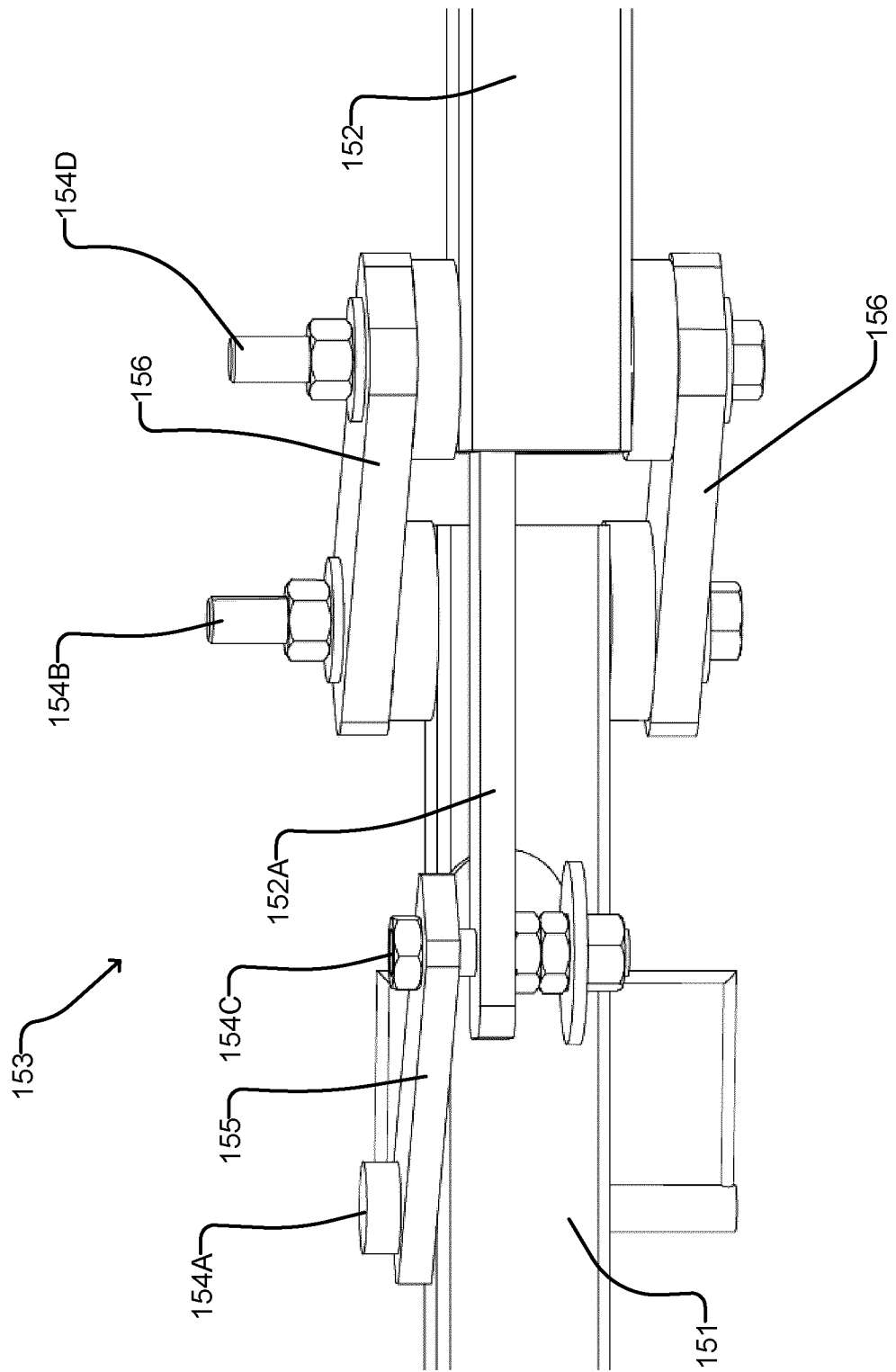
FIG. 11 is a top view of the clevis assembly of FIG. 10 with the bungee cord removed.

With reference to FIGS. 10 and 11, the clevis assembly 153 comprises four pivots 154A, 154B, 154C and 154D. Pivots 154A and 154B are located on the first arm section 151. Pivot 154C is located on an extension 152A of second arm section 152, and pivot 154D is located on the second arm section 152. A first connecting linkage 155 is pivotally connected between pivots 154A and 154C. A pair of second connecting linkages 156 are pivotally connected between pivots 154B and 154D. A bungee cord 157 or other stretchable resilient element is connected between pivots 1546 and 154C. In the illustrated example, pivot 154A is provided in the form of a removable locking pin, and pivots 154B-D are in the form of bolts, with washers provided to reduce friction while pivoting. The clevis assembly 153 allows the push arm assembly 150 to fold up for storage by removing the removable locking pin of pivot 154A to allow the clevis assembly 153 to operate as a hinge for folding the push arm assembly for compact storage as shown in FIG. 8. A rubber support pad 158 may be provided on the first arm section 151 to support the second arm section 152 when the push arm assembly 150 is in the folded configuration. The clevis assembly 153 provides a robust connection between first arm section 151 and second arm section 152 while allowing for about 4 inches of linear movement. When the drive unit 50 pushes the operator forward, the clevis assembly 153 is partially collapsed and the bungee cord 157 is tensioned producing a cushion effect for the user. An adjustable setting of the bungee cord 157 tension varies the amount of cushioning shock absorbing effect for operators of different mass.

The push bar portion 160 comprises a padded horizontal backrest tube 162, which adds the primary forward momentum to the operator's center of gravity. Each end of the padded backrest tube 162 is equipped with a rotating clevis clamp 164 that connects to one of a pair of control handles 172. The control handles 172 contain a throttle control 174, ignition, lights, fuse and safety shutoff. The control handles 172 are fully adjustable for operator comfort and storage.

Power is transferred to the user from the drive unit 50 by the push arm assembly 150. The push arm assembly 150 is substantially rigid (apart from the partial collapsibility of the clevis assembly through tensioning of the bungee cord 157) when the locking pin of the clevis assembly 153 is in place, and is free floating in limited movement about a rotational axis through the push arm mounting bar 106. This allows the track 120 to maintain traction position to the ground while staying aligned with the user during operation. The flange 136 discussed above protects the air intake filter 134, prevents full rotation of the drive unit 50 in relation to the push arm assembly 150, and acts as rest for the first arm section 151 when the push arm assembly 150 is folded up for storage as shown in FIG. 8. The single point attachment of the push arm assembly 150 to the drive unit 50 at the push arm mounting bar 106 prevents binding injury. This single connection is a safer than a connection on both sides would be as there is no enclosed space created above the moving track.

The positioning of the push arm mounting bar 106 on the drive unit 50 is facilitates safe and proper functioning of the transport system 10. The location of the push arm mounting bar 106 on a specific point on the side of the drive unit 50 as shown in the example embodiment is selected for optimal design functionality—high enough that the arm clears obstacles, forward enough that the arm continues to provide forward momentum during varying degrees of pitch of the drive unit 50 on uneven terrain. In some embodiments, the push arm assembly 150 is modular and removable from the drive unit 50 with quick release mechanical and electrical connections provided at the push arm mounting bar 106.

The stability and control of the tracked snow transport system 10 is achieved by the operator applying rotational torque to the push arm assembly 150 via the control handles 172, while track torque and rotation is controlled through the rpm of the motor 152 by the operator's index finger throttle control 174 of the centrifugal clutch, allowing fully automatic track rotation. When throttle is released, transport system 10 will slow down due to friction forces on the track 120.

The present disclosure may be embodied in other specific forms without departing from its spirit or essential characteristics. The described embodiments are to be considered in all respects only as illustrative and not restrictive.

The invention claimed is:

1. A snow transport system comprising:
   a frame comprising a base plate, a pair of opposed side plates mounted on opposed sides of the base plate, and a plurality of cross members extending between the side plates;
   a pair of convex lower track slides mounted on lower portions of the pair of opposed side plates;
   a pair of convex upper track slides mounted on upper portions of the pair of opposed side plates;
   a drive wheel mounted at an upper front portion of the frame;
   an idler wheel mounted at a lower rear portion of the frame;
   a continuous track wrapped around the drive wheel, the convex lower track slides, the idler wheel and the convex upper track slides, wherein the convex lower track slides and the convex upper track slides are curved such that the continuous track bears against the convex lower track slides and the convex upper track slides to provide drag on the continuous track;
   a motor assembly mounted within the frame, and connected to the drive wheel through a transmission assembly; and
   a push arm assembly mounted to one side of the frame, the push arm assembly extending forwardly from the frame and having a push bar portion and user controls at a forward end thereof.

2. A snow transport system according to claim 1 wherein the frame comprises a removable tail assembly and the idler wheel is mounted on the removable tail assembly.

3. A snow transport system according to claim 1 wherein the cross members comprise a tail piece support bar and a push arm mounting bar that extends outward beyond the side plates.

4. A snow transport system according to claim 1 wherein the plurality of cross members includes a drive shaft for mounting the drive wheel, a secondary drive shaft of the transmission assembly, and a mounting bar for the push arm assembly.

5. A snow transport system according to claim 1 wherein the convex lower track slides and the convex upper track slides are constructed from nylon strips.

6. A snow transport system according to claim 1 wherein the motor assembly includes an air intake comprising a filter and a flange for protecting the filter and acting as a stop for the push arm assembly.

7. A snow transport system according to claim 1 wherein the push arm assembly is mounted on a first lateral side of the transport system and the transmission assembly is mounted on a second lateral side of the transport system opposite the first lateral side.

8. A snow transport system according to claim 7 comprising a fuel tank on the first lateral side and an exhaust on the second lateral side.

9. A snow transport system according to claim 1 wherein the push arm assembly comprises a first arm section pivotally connected to the frame, and a second arm section pivotally connected to the first arm section by a four point clevis assembly.

10. A snow transport system according to claim 9 wherein the four point clevis assembly comprises two pivots on the first arm section and two pivots on the second arm section with a first connecting linkage pivotally connected between a rearward one of the two pivots on each of the first and second arm sections, and a second connecting linkage pivotally connected between a forward one of the two pivots on each of the first and second arm sections, and a stretchable resilient member connected between the forward one of the two pivots on the first arm section and the rearward one of the two pivots on the second arm section.

11. A snow transport system according to claim 10, wherein one of the pivots comprises a removable locking pin such that, when the removable locking pin is removed, the four point clevis assembly acts as a hinge allowing the second arm section to be folded atop the first arm section.

12. A snow transport system according to claim 1 wherein the opposed side plates and the convex lower track slides have upwardly angled forward portions and flat middle and rear portions.

13. A snow transport system according to claim 12 wherein the upwardly angled forward portions are at an angle of about 40 to 60 degrees from horizontal.

\* \* \* \* \*